United States Patent
Ogino et al.

(10) Patent No.: US 7,548,887 B1
(45) Date of Patent: Jun. 16, 2009

(54) INFORMATION-SIGNAL PLAYBACK SYSTEM, INFORMATION-SIGNAL READING APPARATUS, INFORMATION-SIGNAL PROCESSING APPARATUS, INFORMATION-SIGNAL PLAYBACK METHOD, INFORMATION-SIGNAL READING METHOD AND INFORMATION-SIGNAL PROCESSING APPARATUS

(75) Inventors: Akira Ogino, Tokyo (JP); Yuji Kimura, Kanagawa (JP); Tadashi Ezaki, Tokyo (JP); Teruhiko Kori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/351,399

(22) Filed: Jul. 13, 1999

(30) Foreign Application Priority Data

Jul. 15, 1998 (JP) ................................ 10-200264

(51) Int. Cl.
*G06F 17/00* (2006.01)
(52) U.S. Cl. .............................. 705/57; 705/1; 705/54; 380/259
(58) Field of Classification Search .................. 705/57, 705/58, 50, 59, 1, 45; 369/30, 25, 275.3; 380/201, 259
See application file for complete search history.

(56) References Cited

U.S. PATENT DOCUMENTS

| | | | | |
|---|---|---|---|---|
| 5,392,351 A * | 2/1995 | Hasebe et al. | ................. | 705/51 |
| 5,896,454 A | 4/1999 | Cookson et al. | | |
| 5,933,498 A * | 8/1999 | Schneck et al. | ................ | 705/54 |
| 6,031,815 A * | 2/2000 | Heemskerk | .............. | 369/275.3 |
| 6,052,780 A * | 4/2000 | Glover | ....................... | 713/193 |
| 6,226,618 B1 * | 5/2001 | Downs et al. | ................... | 705/1 |
| 6,301,663 B1 * | 10/2001 | Kato et al. | ............... | 380/201 X |
| 6,314,409 B2 * | 11/2001 | Schneck et al. | .......... | 369/275.3 |
| 6,351,439 B1 | 2/2002 | Miwa et al. | | |
| 6,374,036 B1 * | 4/2002 | Ryan et al. | ............... | 380/201 X |

FOREIGN PATENT DOCUMENTS

JP 04-245368 9/1992

(Continued)

OTHER PUBLICATIONS

Schneier, Bruce "Applied Cryptography" (c) 1996. John Wiley and Sons; Canada. pp. 30-31.*

*Primary Examiner*—Calvin Hewitt
*Assistant Examiner*—John M Winter
(74) *Attorney, Agent, or Firm*—Finnegan, Henderson, Farabow, Garrett & Dunner, L.L.P.

(57) ABSTRACT

The present invention relates to an apparatus and a method for protecting the copyright of an information signal recorded on a recording medium such as a DVD (Digital Video Disc) for presenting the signal to the user or an information signal transmitted through transmission media such as the Internet and for preventing an illegal copy of such an information signal. To put it in detail, information on copyright protection which is read out from the recording medium and information on copyright protection which is encrypted to make the information difficult to alter is used. If both of the information do not match each other, the information on copyright protection is judged to have been altered in an attempt to play back the information signal which is obtained as a result of an illegal copy operation in which case, the operation to play back the information signal is disabled.

14 Claims, 9 Drawing Sheets

FOREIGN PATENT DOCUMENTS

| | | |
|---|---|---|
| JP | 04-333888 | 11/1992 |
| JP | 05-307496 | 11/1993 |
| JP | 07-161138 | 6/1995 |
| JP | 09-018469 | 1/1997 |
| JP | 09-055731 | 2/1997 |
| JP | 09-139931 | 5/1997 |
| JP | 09-149022 | 6/1997 |
| JP | 10-65662 * | 3/1998 |
| JP | 10-106148 | 4/1998 |
| JP | 10-149621 | 6/1998 |
| JP | 10-161936 | 6/1998 |
| JP | 2000-501875 | 2/2000 |
| WO | WO 98/16928 | 4/1998 |

* cited by examiner

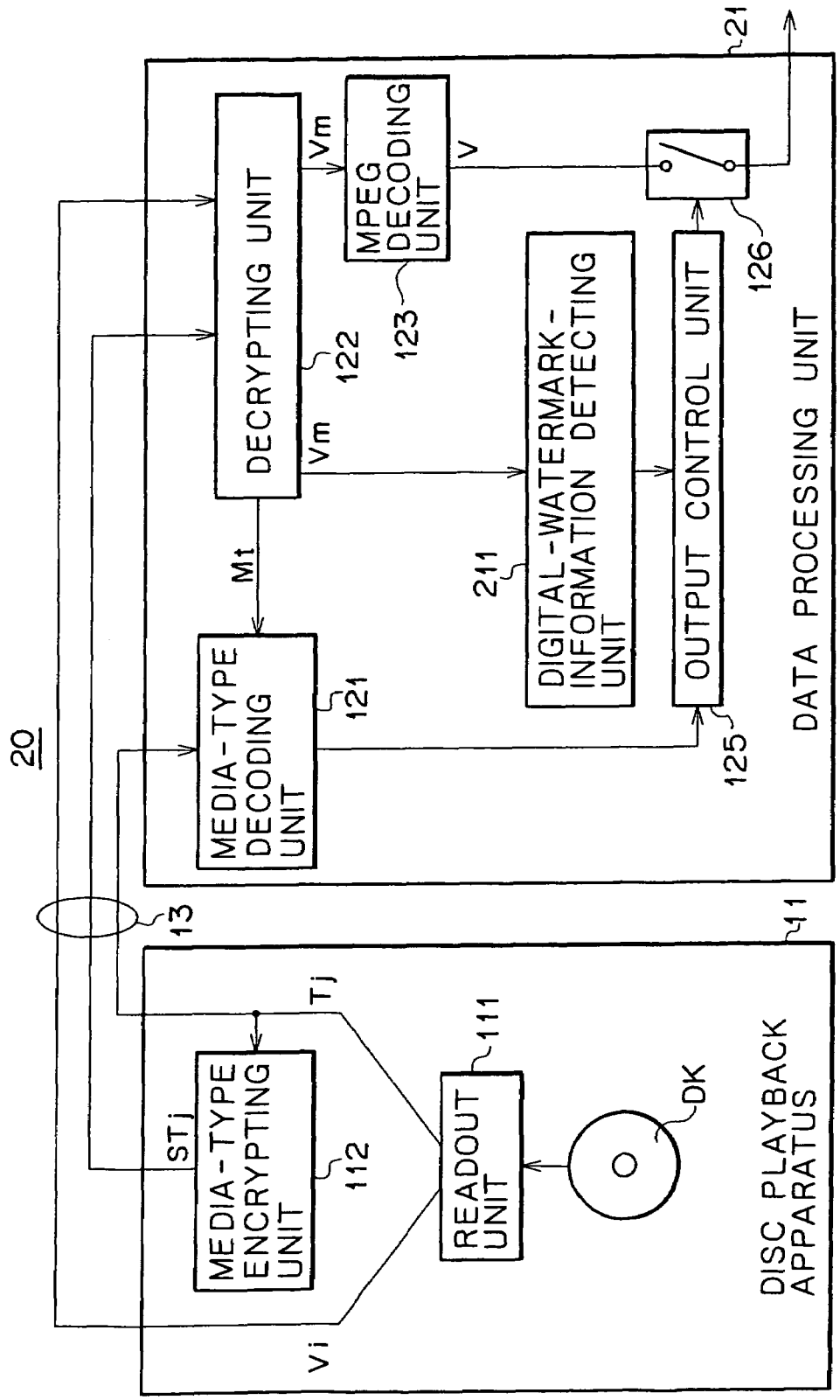

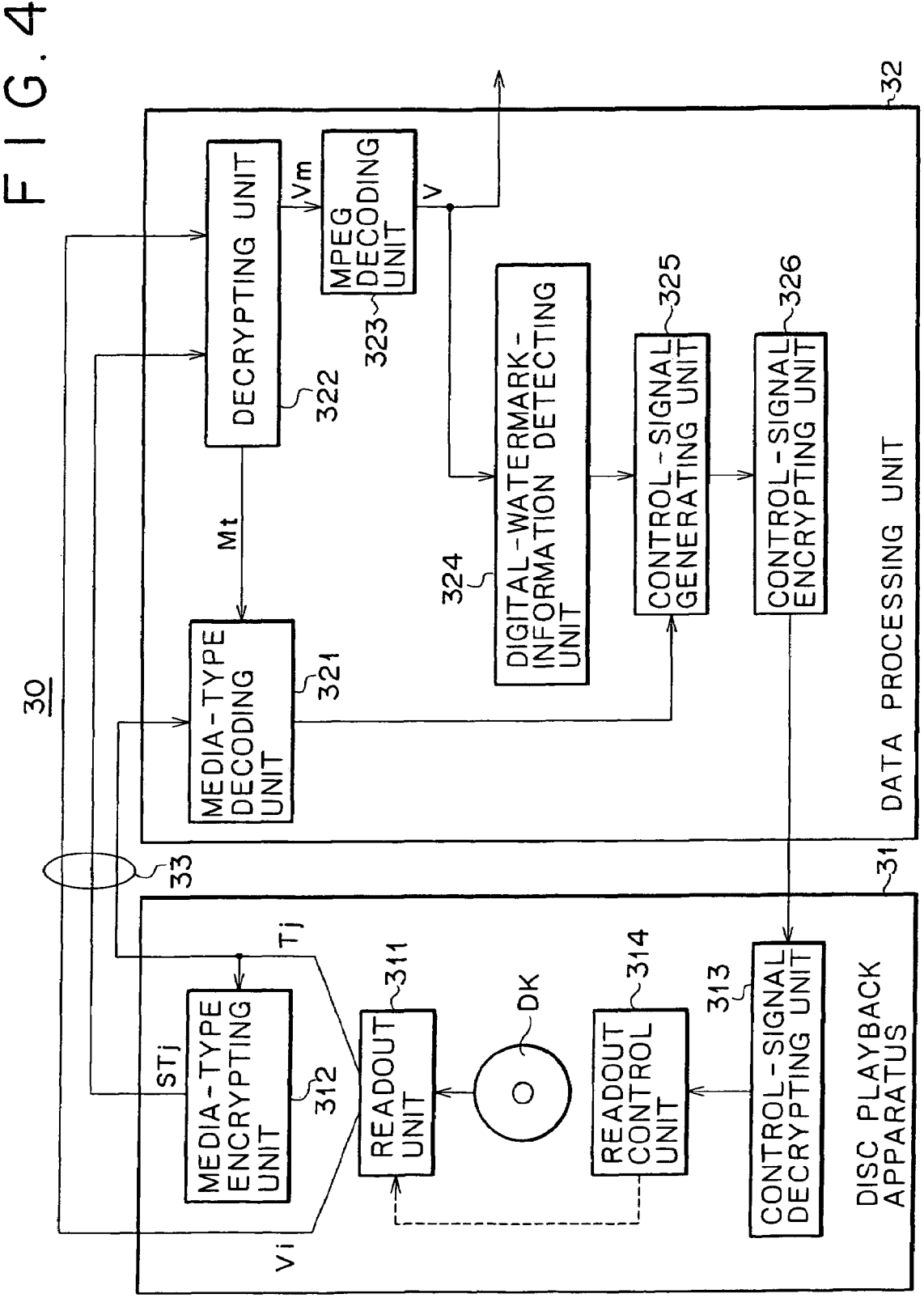

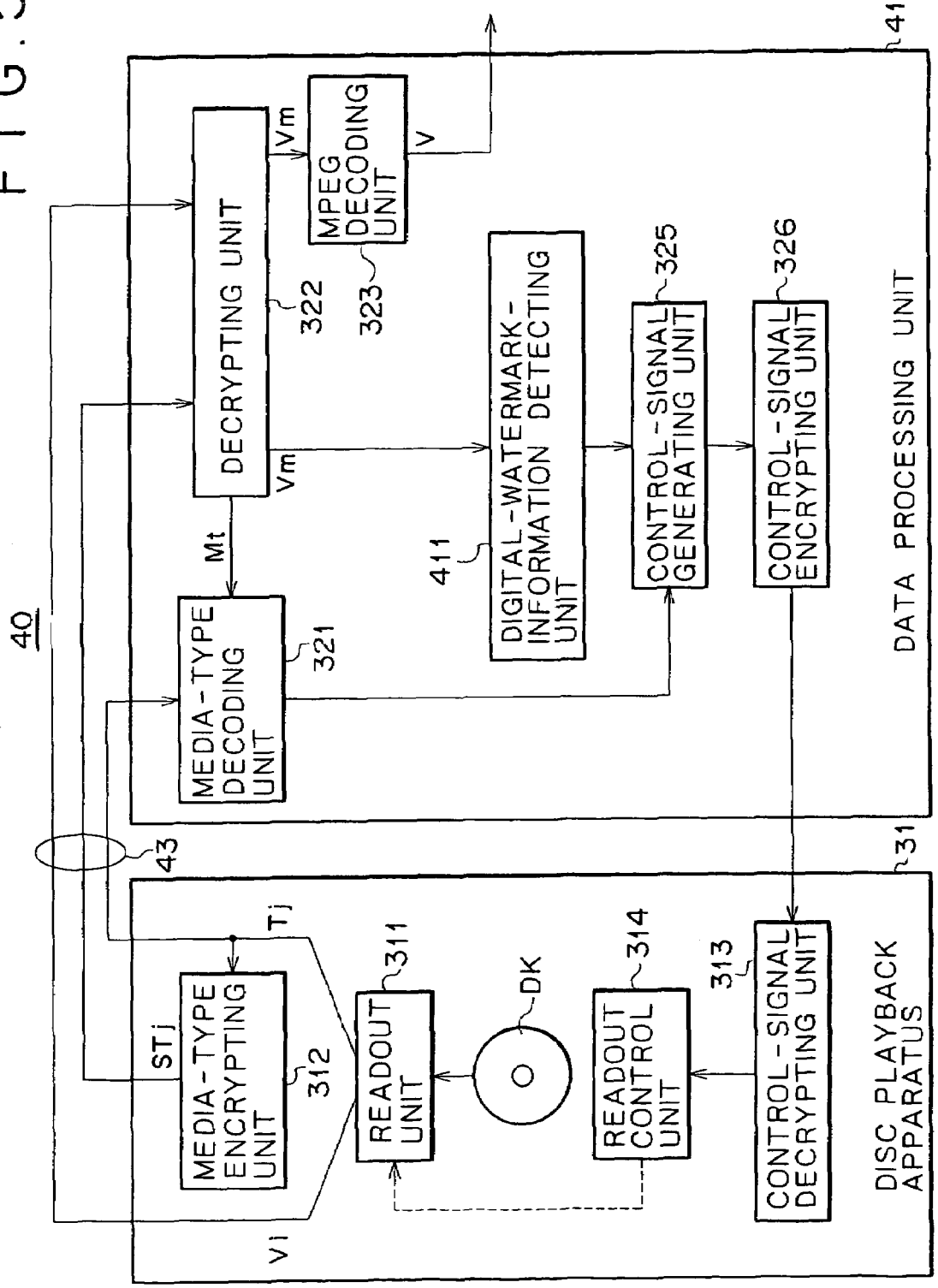

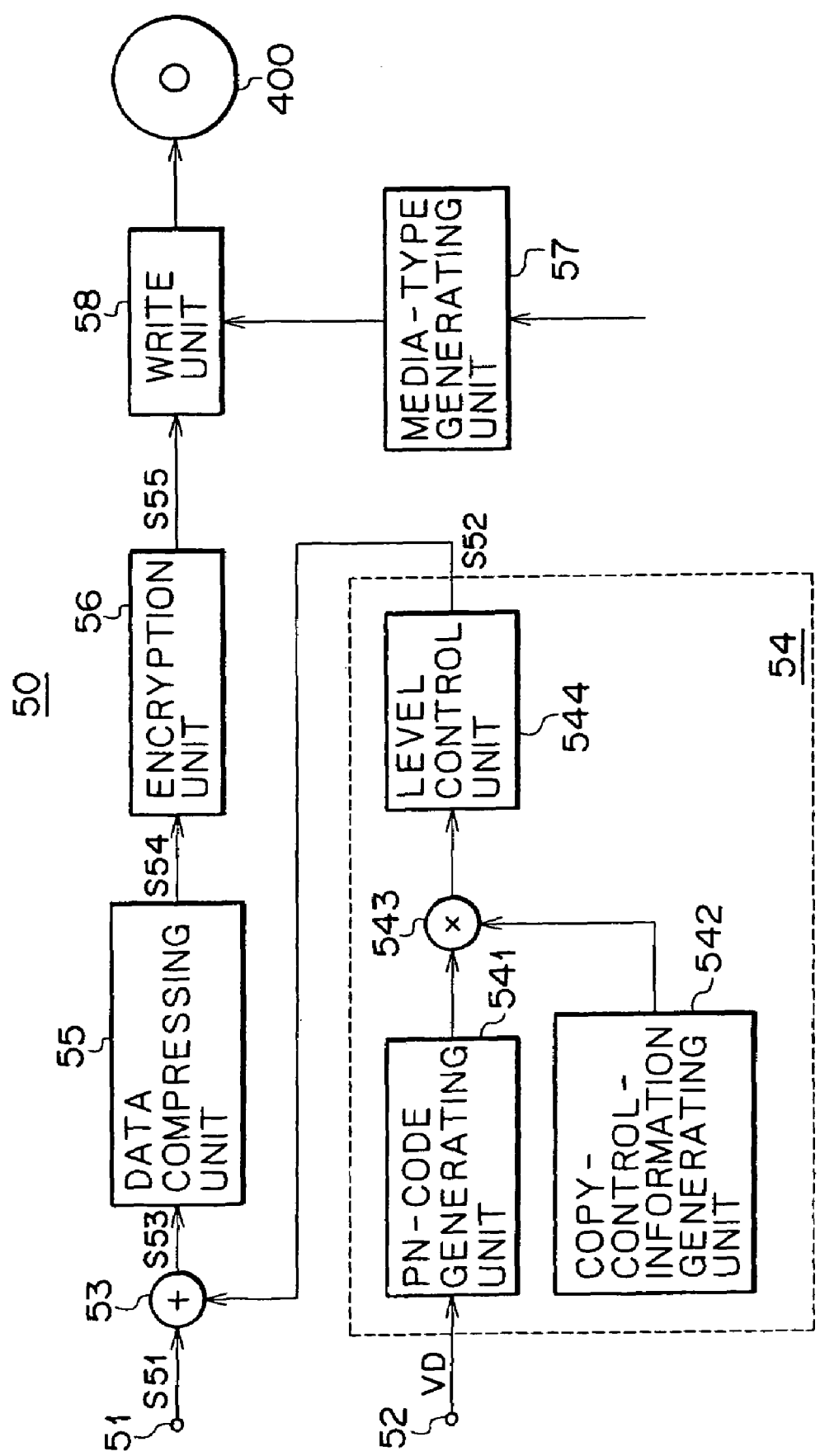

COPY-CONTROL-INFORMATION SPECTRUM BEFORE SPECTRUM SPREADING

COPY-CONTROL-INFORMATION SPECTRUM AFTER SPECTRUM SPREADING

SPECTRUM OF AN INFORMATION SIGNAL WITH SS-COPY-CONTROL INFORMATION SUPERPOSED THEREON

SIGNAL SPECTRUM AFTER SPECTRUM INVERSE SPREADING

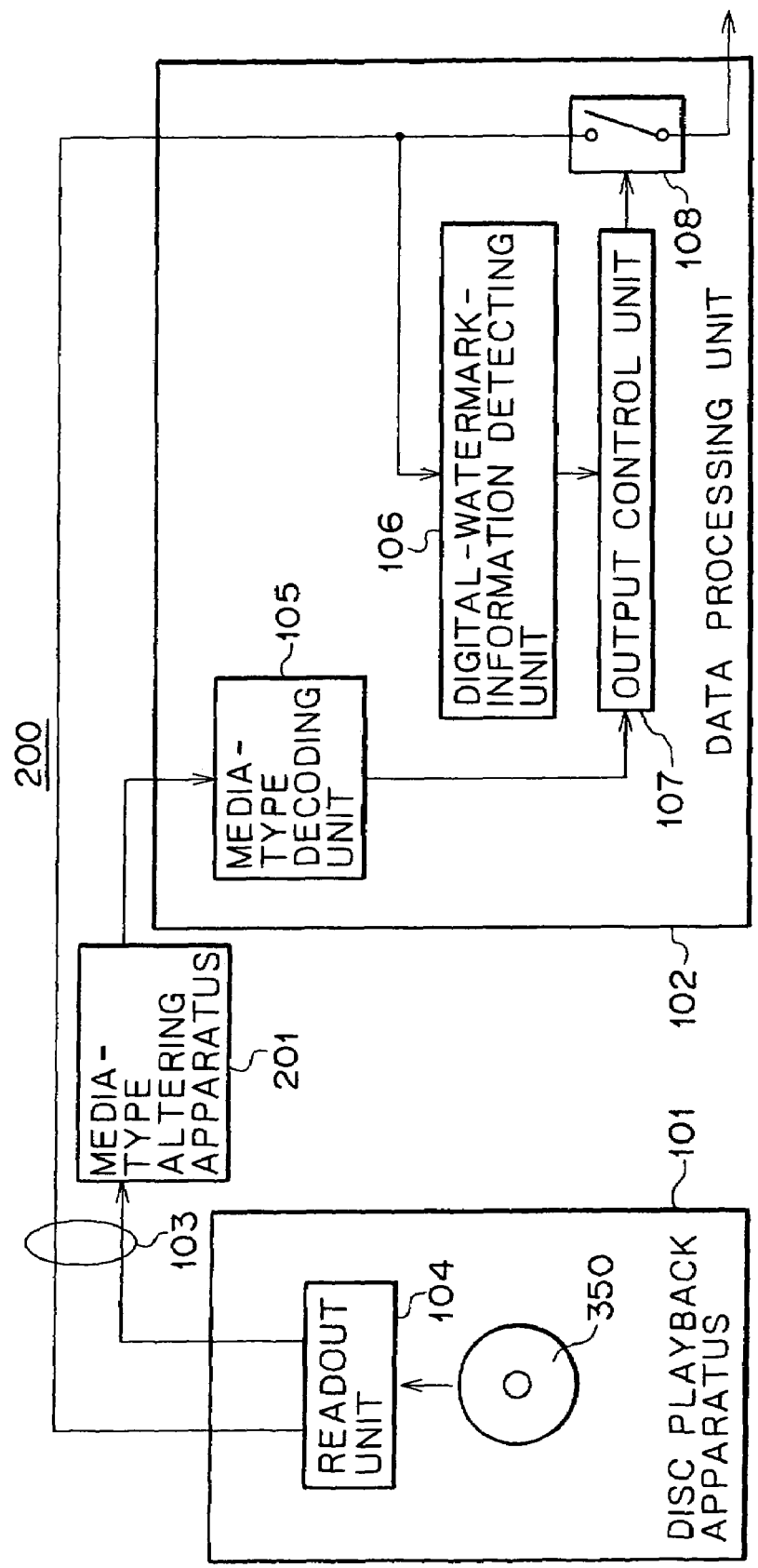

INFORMATION-SIGNAL PLAYBACK SYSTEM, INFORMATION-SIGNAL READING APPARATUS, INFORMATION-SIGNAL PROCESSING APPARATUS, INFORMATION-SIGNAL PLAYBACK METHOD, INFORMATION-SIGNAL READING METHOD AND INFORMATION-SIGNAL PROCESSING APPARATUS

BACKGROUND OF THE INVENTION

The present invention relates to an information-signal playback system, an information-signal reading apparatus, an information-signal processing apparatus, an information-signal playback method, an information-signal reading method and an information-signal processing method for protecting the copyright of an information signal recorded on recording media such as a DVD (Digital Video Disc) for presenting the information signal to the user or an information signal transmitted through transmission media such as the Internet and for preventing an illegal copy of such an information signal from being produced.

With popularization of digital contents transmitted through the Internet and recorded on a digital video disc going on in recent years, infringement of a copyright granted to authors of digital contents in the form of an illegal copy of the digital contents becomes a problem. In order to solve the problem, there is a conceivable technique for preventing an illegal copy of digital contents from being produced. The technique uses information added to the digital contents for controlling copies of the digital contents.

With regard to prevention of an illegal copy from being produced, one can conceive a control implementation whereby a copy is not allowed at all and another control implementation in which a copy produced from an original source is allowed, but not of a copy produced from a copy in dependence on a source on which the copy prevention control is to be implemented. The latter is also referred to as a generation-limited copy control system. The former is applied to original software produced and sold by a content maker such as contents of a DVD-ROM. On the other hand, the generation-limited copy control system is applied to, among others, information transmitted through broadcasting media.

In the case of the generation-limited copy control system, a system capable of controlling copy generations is desirable. As a system of information on copy control capable of controlling copy generations, there have been proposed a CGMS (Copy Generation Management System) and a system using digital-watermark processing.

The digital-watermark processing is processing to embed information as noise into a part of picture data or music data which is trivial to the perception of a human being or a non-redundant part of a piece of music or a picture. Additional information embedded in such digital-watermark processing into picture or music data is difficult to extract from the data. On the other hand, it is possible to detect additional information embedded in such digital-watermark processing into picture or music data from the data even after the data has been subjected to a filtering process or data compression.

In the case of a copy control system using digital-watermark processing, additional information to be embedded into picture or music data indicates one of the following 4 control implementations:

(1) Copy Free (allowing copies to be produced freely)
(2) One Copy (allowing only the first copy generation to be produced)
(3) No More Copy (allowing no subsequent copy generations)
(4) Never Copy (absolutely allowing no copy)

The above control implementations represent restrictions of copy generations and copies of the picture or music data on which information is superposed by the digital-watermark processing.

In the copy-free control implementation, music or picture data can be copied freely. In the one-copy control implementation, only the first copy generation of music or picture data can be produced. The no-more-copy control implementation is applied to music or picture data of the first copy generation which has been produced in compliance with the one-copy control implementation (the second control implementation). With the no-more-copy control implementation, music or picture data of the first copy generation is prohibited from copying. The never-copy control implementation (the fourth control implementation) does not allow a copy to be produced at all.

If digital-watermark information superposed on picture or music data indicates the one-copy control implementation, a recording apparatus conforming digital-watermark processing (that is conforming to copy-restriction processing) will find out that the picture or music data can be copied and recorded, and thus record a copy of the data. However, the recording apparatus will update the digital-watermark information to information indicating the no-more-copy control implementation and superpose the updated information on the recorded data. If digital-watermark information superposed on picture or music data to be dubbed indicates the no-more-copy control implementation, on the other hand, a recording apparatus conforming digital-watermark processing will determine that an operation to copy and record the picture or music data thereof is prohibited and inhibit a recording operation.

The CGMS system is a system in which 2-bit additional information for copy control is superposed on 1 specific horizontal zone in a vertical blanking period if the picture signal is an analog signal, or 2-bit additional information is added to picture data if the picture data is digital data.

The 2-bit information added by the CGMS system which is referred to hereafter as CGMS information has the following meanings:

[00]—Copy-free control implementation

[10]—One-copy control implementation (allowing one-generation copy)

[11]—Never-copy control implementation (copy strictly prohibited)

The CGMS system does not implement the no-more-copy control implementation described above.

If the CGMS information added to picture data is [10], a recording apparatus conforming to the CGMS system will find out that the picture data can be copied and recorded and record a copy of the data. However, the recording apparatus will update the CGMS information to [11] and superpose the updated information on the recorded data. If CGMS information superposed on picture data to be recorded is [11], on the other hand, a recording apparatus conforming to the CGMS system will determine that an operation to copy and record the picture data thereof is prohibited and inhibit a recording operation.

By the way, in a recording apparatus not implementing copy control based on information on copy control such as CGMS information or digital-watermark information, for example, an input main information signal can be copied in some cases even if the input main information signal includes additional information on copy control indicating the never-copy or one-copy control implementation.

In order to solve the aforementioned problem, in addition to the digital-watermark and CGMS information described above, information on copyright protection is recorded into a recording medium for recording a main information signal including picture or music data. One can conceive that, by using information on copyright protection, a person committing an illegal copy act can be investigated with ease and can be proven easily, and the use of an illegally copied main information signal can be invalid.

Examples of the information on copyright protection are information identifying an author creating the main information signal, various kinds of information useful for proving, investigating or exposure of an illegal copying act and information restricting the use of a main information signal. The information identifying an author includes the name or a code of the author. The information useful for proving, investigating or exposure of an illegal copying act includes a date on which a main information signal is recorded into a recording medium or data for identifying a recording apparatus. The information restricting the use of a main signal includes information indicating a valid period during which the user is allowed to use the main information signal and the serial number of an apparatus for playing back the main information signal.

In addition, in the case of a disc recording medium, in order to allow a playback or recording apparatus to distinguish a read-only ROM disc or a rewritable RAM disc from each other, medium-type identification information is recorded typically in a TOC (Table of Contents) or a directory of the disc. The medium-type identification information is also used as information on copyright protection. For example, by using the medium-type identification information in conjunction with digital-watermark information described above, it is possible to inhibit an operation to play back a main information signal obtained as a result of an illegal copy operation.

This is because there will be a difference in information on copy control added to a main information signal recorded on a recording medium between an unrewritable read-only ROM disc legally containing a main information signal such as picture data presented by a content maker and a rewritable RAM disc containing information obtained as a result of an operation to copy a main information signal which is originally recorded on such a ROM disc and presented to the user through communication media such as the Internet.

That is to say, in the case of the so-called commercially available ROM disc, digital-watermark information indicating a never-copy control implementation is normally added to a main information signal recorded on the ROM disc in order to protect the disc from an operation to illegally copy the signal.

In the case of a RAM disc used by the user mainly for recording a main information signal, on the other hand, digital-watermark information indicating a never-copy or a one-copy control implementation is never added to the main information signal recorded on the disc.

That is to say, digital-watermark information which shows a never-copy control implementation and is added to a main information signal recorded on a RAM disc indicates that the main information signal has been obtained as a result of an operation to illegally copy a main information signal recorded on a ROM disc implementing the never-copy control.

In addition, when digital-watermark information which shows a one-copy control implementation added to a main information signal recorded on a RAM disc is rewritten by an apparatus implementing copy control based on information on copy control into a no-more-copy control implementation and the main information signal with this digital-watermark information indicating the no-more-copy control implementation is then recorded into the RAM disc. Thus, a main information signal recorded on a RAM disc will not eventually have digital-watermark information indicating a one-copy control implementation. If such a RAM disc exists, the main information signal recorded therein must have been obtained as a result of an illegal copy operation.

In addition, even though a main information signal recorded normally on a ROM disc may have additional digital-watermark information indicating a never-copy control implementation, the main information signal is never rewritten into a ROM disc. Thus, there is no way that a main information signal recorded on a ROM disc has additional digital-watermark information indicating a no-more-copy control implementation.

It should be noted that additional information indicating a one-copy control implementation for a main information signal recorded on a ROM disc allows a first-generation copy of the main information signal to be produced from the ROM disc. The permission to generate a first-generation copy also means that a copy of the main information signal can always be produced as long as the copy is made from the same ROM disc as an original source and also means that, as a matter of fact, the main information signal can be copied from the ROM disc with a high degree of freedom. The presentation of a main information signal in such a way is not conceived as a desirable presentation from the copyright-protection point of view. Nevertheless, the fact that the use of additional information indicating a one-copy control implementation for a main information signal recorded on a ROM disc is not prohibited means that the presentation of a main information signal in such a way may exist.

In order to take advantage of the fact that a difference in information on copy control added to a main control signal recorded on a recording medium exists between a ROM disc and a RAM disc as described above, there has been conceived a disc playback apparatus shown in FIG. 8 wherein control to play back a main information signal from a disc such as a DVD is executed by using media identification information of the disc in conjunction with information on copy control such as the digital-watermark information added to the main information signal. The media identification information is also referred to hereafter as information on the media type. The conceivable disc playback apparatus of this type is explained as follows.

As shown in FIG. 8, an information-signal playback apparatus (an information-signal playback system) 100 comprises a disc playback apparatus 101, a data processing unit 102 and a transmission line 103 connecting the disc playback apparatus 101 and the data processing unit 102. In this system, the disc playback apparatus 101 is implemented typically by a disc drive apparatus for reading out a main information signal from a disc such as a DVD. On the other hand, the data processing unit 102 is a personal computer for carrying out predetermined processing on a main information signal read out by the disc playback apparatus 101 from a disc and for outputting a result of the processing.

A disc 300, on which a main information signal to be played back has been recorded, is mounted on the disc playback apparatus 101. Then, a readout unit 104 employed in the disc playback apparatus 101 reads out the main information signal recorded in a data area of the disc 300 and information on the media type recorded typically in a TOC of the disc 300.

The information on the media type is then supplied to a media-type decoding unit 105 employed in the data processing unit 102 through the transmission line 103 and the main information signal is supplied to a digital-watermark-information detecting unit 106 and a switch circuit 108 also employed in the data processing unit 102 through the transmission line 103.

The media-type decoding unit 105 decodes the information on the media type, outputting information indicating whether the disc 300 mounted on the disc playback apparatus 101 is a RAM or ROM disc to an output control unit 107. On the other hand, the digital-watermark-information detecting unit 106 detects the information on copy control superposed on the main information signal as digital-watermark information, outputting the information on copy control also to the output control unit 107.

The output control unit 107 controls a switch circuit 108 to turn on or off in accordance with the information indicating the media type and the information on copy control. To put it in detail, if the disc 300 is a ROM disc with the information on copy control indicating a no-more-copy control implementation or if the disc 300 is a RAM disc with the information on copy control indicating a never-copy or one-copy control implementation, the output control unit 107 determines that the main information signal recorded on the disc 300 is an illegal copy as described above. In this case, the output control unit 107 executes control to turn off the switch circuit 108, disallowing the main information signal to be supplied to any apparatus at the following stage. Otherwise, the output control unit 107 determines that the main information signal recorded on the disc 300 is legally produced, executing control to turn on the switch circuit 108.

In this way, by referring to the information on the media type of a disc containing a recorded main information signal to be played back, the information-signal playback system 100 is capable of preventing a main information signal illegally recorded on the disc from being played back.

If the information on the media type of the disc is improperly altered during transmission between the disc playback apparatus 101 and the data processing unit 102, however, a main information signal illegally recorded on the disc can be played back and manipulated illegally. As a result, there is raised a problem of repeated illegal copy operations. Assume that a main information signal recorded on a ROM disc with additional digital-watermark information indicating the never-copy control implementation is illegally copied into a RAM disc which normally never includes information on copy control indicating a never-copy control implementation. Since the RAM disc illegally copied the contents of the ROM disc, however, there are some cases where the main information signal copied into the RAM disc has the additional digital-watermark information indicating the never-copy control implementation.

In such a case, the information-signal playback system 100 shown in FIG. 8 will not play back the main information signal illegally copied into the RAM disc provided that the playback control described above is executed normally. With an illegal playback system 200 shown in FIG. 9, however, a main information signal obtained as a result of an illegal copy operation can be played back and manipulated with a high degree of freedom as described below.

A media-type altering apparatus 201 shown in FIG. 9 is used for altering information on the media type read out from a disc by the readout unit 104 employed in the disc playback apparatus 101 to information indicating another media type. To be more specific, the media-type altering apparatus 201 alters information on the media type read out from the disc by the readout unit 104 to other media-type information indicating a ROM disc, if the information read out indicates a RAM disc, or to other media-type information indicating a RAM disc if the information indicates a ROM disc. Then, the media-type altering apparatus 201 supplies the altered information on the media type to the media-type decoding unit 105 employed in the data processing unit 102.

When a RAM disc is illegally recorded a main information signal with additional digital-watermark information indicating the never-copy control implementation by means of a ROM disc or indicating the never-copy or one-copy control implementation by the way of the Internet, the illegal playback system shown in FIG. 9 is capable of normally playing back a main information signal presented to the user along with additional digital-watermark information indicating the never-copy control implementation or presented to the user along with additional digital-watermark information indicating the never-copy or one-copy control implementation by the way of the Internet. Accordingly, even a main information signal obtained as a result of an illegal copy operation of the signal into a RAM disc can be utilized. In this case, the copyright is infringed by the use of the illegal main information signal.

Such infringement of a copyright is made possible by alteration of not only information on the media type but also other information on copyright protection such as information indicating a valid period during which the user is allowed to play back a main information and information restricting usable playback apparatuses. That is to say, with these other pieces of information on copyright protection altered after being read out from a disk, control of an operation to play back a main information signal can no longer be executed normally. Also in this case, a main information signal obtained as a result of an illegal copy operation or a main information signal with restricted playback operations can be reproduced without restrictions and the author of the main information signal loses many benefits, to which the author is entitled.

SUMMARY OF THE INVENTION

It is thus an object of the present invention addressing the problems described above to provide an apparatus and a method for protecting a copyright of a main information signal with a high degree of reliability and for preventing a main information signal from being copied illegally by substantially disabling an operation to play back a main information signal obtained as a result of an illegal copy operation.

In order to solve the problems described above, the present invention provides an information-signal playback system comprising an information-signal reading apparatus for reading out a main information signal and information on copyright protection from a recording medium containing the main information signal and information on at least copyright protection, and an information-signal processing apparatus for receiving the main information signal and the information on copyright protection supplied from the information-signal reading apparatus, wherein the information-signal reading apparatus has a readout means for reading out the information on copyright protection from the recording medium; an encryption means for encrypting the information on copyright protection read out by the readout means; and an output means for supplying the information on copyright protection encrypted by the encryption means and the unencrypted information on copyright protection to the information-signal processing apparatus, and the information-signal processing apparatus has a decryption means for decrypting the encrypted information on copyright protection supplied from the information-signal reading apparatus; and a control means for controlling predetermined processing carried out on the main information signal on the basis of the unencrypted information on copyright protection received from the information-signal reading apparatus and information on copyright protection obtained as a result of decryption carried out by the decryption means.

The readout means employed in the information-signal readout apparatus reads out information on copyright protection from a recording medium. By using the information on copyright protection, a person committing an illegal copying act can be investigated with ease, an illegal copying act can also be easily proven and the use of an illegally copied main information signal can be disabled as well.

The encryption means encrypts the information on copyright protection read out by the readout means and the output means supplies the information on copyright protection encrypted by the encryption means and the unencrypted information on copyright protection to the information-signal processing apparatus. In this way, both the information on copyright protection encrypted by the encryption means and the unencrypted information on copyright protection are supplied to the information-signal processing apparatus. Even though the contents of the 2 pieces of information on copyright protection are the same, the states in which the 2 pieces of information are transferred to the information-signal processing apparatus are different.

In the information-signal processing apparatus, the encrypted information on copyright protection is decrypted by the decryption means. Then, the control means controls predetermined processing carried out on the main information signal on the basis of the unencrypted information on copyright protection supplied from the information-signal reading apparatus and the information on copyright protection obtained as a result of the decryption carried out by the decryption means.

As described above, both the information on copyright protection read out from the recording medium and encrypted information on copyright protection are used. Since the encrypted information on copyright protection is difficult to alter, it will be possible to determine whether or not the information on copyright protection has been altered in an attempt to play back the main information signal obtained as a result of an illegal copy operation. When thus discriminated being different from each other, a main information signal obtained as a result of an illegal copy operation can be prevented from being played back with a high degree of reliability.

Typical information on the media type recorded in a recording medium is information which indicates whether the recording medium is a read-only ROM disc or a writable RAM disc and is recorded in the TOC or the directory of the recording medium. This information on the media type can be used as information on copyright protection which is then encrypted and supplied to the information-signal processing apparatus along with the unencrypted one.

In general, it is difficult to alter the encrypted information on copyright protection, even though the unencrypted one read out from the disc can be altered. As a result, if the unencrypted information on copyright protection is found different from information on copyright protection obtained as a result of decryption of the encrypted information on copyright protection, the unencrypted information on copyright protection is judged to have been altered in an attempt to play back a main information signal resulting from an illegal copy operation. Thus, a main information signal obtained as a result of an illegal copy operation can be prevented from being played back with a high degree of reliability. In addition, the present invention provides another information-signal playback system comprising an information-signal reading apparatus for reading out a main information signal and information on copyright protection from a recording medium containing the main information signal and information on at least copyright protection, and an information-signal processing apparatus for receiving the main information signal and the information on copyright protection supplied from the information-signal reading apparatus, wherein the information-signal reading apparatus has a readout means for reading out the information on copyright protection from the recording medium; an encryption means for encrypting the information on copyright protection read out by the readout means; an output means for supplying the information on copyright protection encrypted by the encryption means and the unencrypted information on copyright protection to the information-signal processing apparatus; and a readout control means for controlling an operation to read out the main information signal from the recording medium in accordance with a readout-control signal received from the information-signal processing apparatus, and the information-signal processing apparatus has a decryption means for decrypting the encrypted information on copyright protection received from the information-signal reading apparatus; and a readout-control-signal generating means for generating the readout-control signal based on the unencrypted information on copyright protection received from the information-signal reading apparatus and information on copyright protection obtained as a result of decryption carried out by the decryption means and for supplying the readout-control signal to the information-signal reading apparatus.

In the information-signal reading apparatus, information on copyright protection is read out by the readout means from a recording medium and supplied to the encryption means. Then, the encrypted information on copyright protection is supplied to the information-signal processing apparatus along with the unencrypted information on copyright protection.

In the information-signal processing apparatus, the information on copyright protection encrypted by the encryption means employed in the information-signal reading apparatus is decrypted by the decryption means employed in the information-signal processing apparatus. Then, the readout-control-signal generating means generates the readout-control signal based on the unencrypted information on copyright protection received from the information-signal reading apparatus and the information on copyright protection decrypted by the decryption means and supplies the readout-control signal to the information-signal reading apparatus.

In the information-signal reading apparatus, the readout control means controls an operation to read out the main information signal from the recording medium on the basis of the readout-control signal received from the information-signal processing apparatus.

As a result, it is possible to reliably prevent an operation to play back a main information signal with altered information on copyright protection superposed on the main information signal which has been obtained as a result of an illegal copy operation. With this information-signal playback system, since the operation to read out a main information signal from the recording medium itself is controlled, reproduction of the main information signal can be restricted with a high degree of reliability.

BRIEF DESCRIPTION OF THE DRAWINGS

FIG. 3 is a block diagram used for explaining a modification of the information-signal playback system shown in FIG. 1;

FIG. 4 is a block diagram used for explaining another implementation of the information-signal playback system shown in FIG. 1;

FIG. 5 is a block diagram used for explaining a modification of the information-signal playback system shown in FIG. 1;

FIG. 6 is a block diagram used for explaining an information-signal recording apparatus for producing a disc recording medium for regularly recording an information signal;

FIG. 9 is a block diagram used for explaining an information-signal playback system capable of altering information on an attribute of a recording medium.

DETAILED DESCRIPTION OF THE PREFERRED EMBODIMENTS

Figure 1:
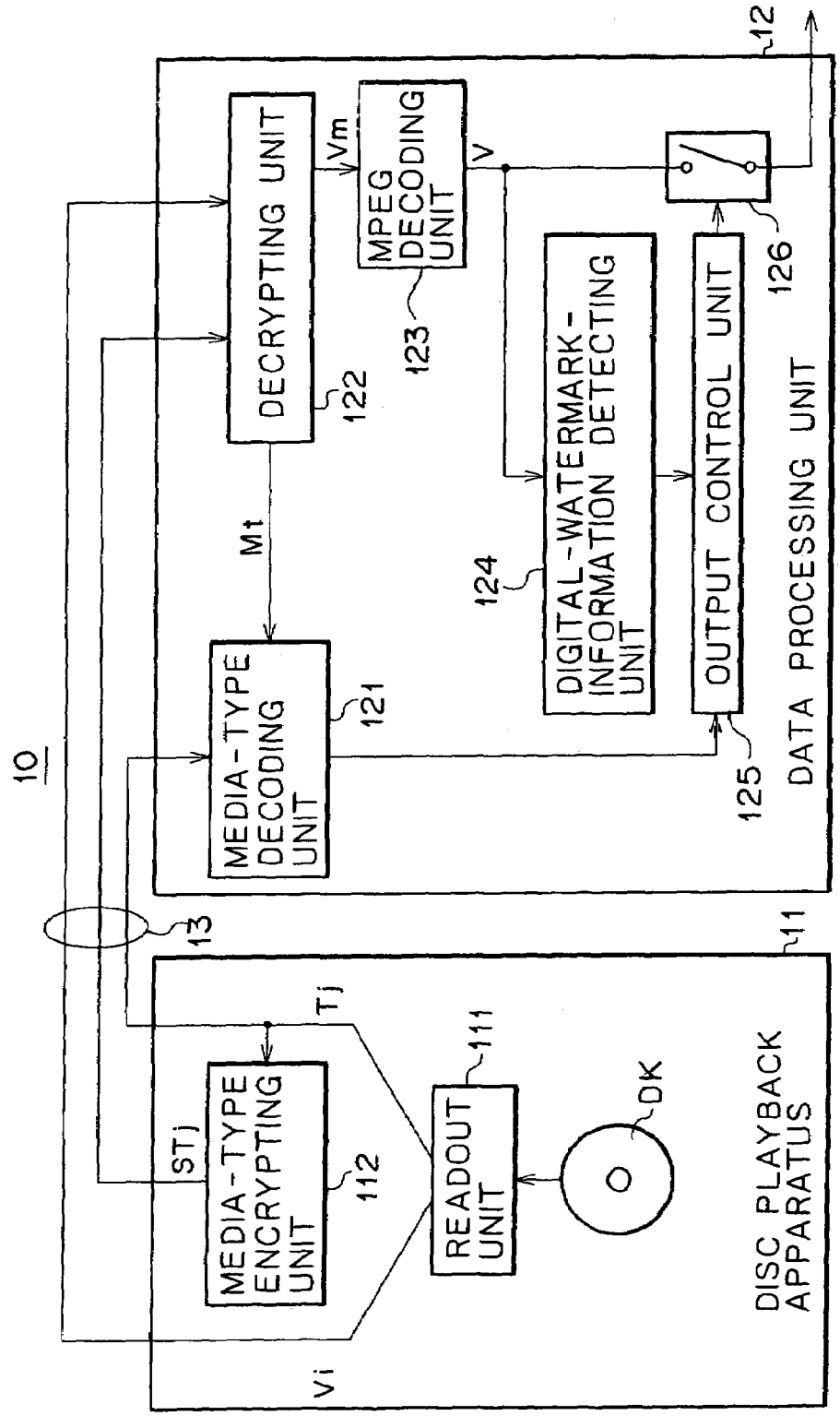
FIG. 1 is a block diagram used for explaining an embodiment implementing an information-signal playback system provided by the present invention.

Next, an information-signal playback system, an information-signal reading apparatus, an information-signal processing apparatus, an information-signal playback method, an information-signal reading method and an information-signal processing method as implemented by embodiments of the present invention are described by referring to diagrams.

[Overview of the Information-Signal Playback System]

First of all, an overview of the information-signal playback system (information-signal playback apparatus) implemented by an embodiment of the present invention is described. The information-signal playback system implemented by the embodiment described below comprises an information-signal reading apparatus for reading out a main information signal from a recording medium and an information-signal processing apparatus for carrying out predetermined processing on the main information signal read out by the information-signal reading apparatus.

In an operation to play back data such as a main information signal like picture information from a disc recording medium, the information-signal playback system also forms a judgment as to whether or not the main information signal to be played back has been obtained as a result of an illegal copy operation in order to prevent an illegal main information signal from being played back. As a result, the copyright on the main information signal can be protected and an illegal operation to copy the main information signal can be avoided.

The formation of a judgment as to whether or not a main information signal recorded on a disc recording medium has been obtained as a result of an illegal copy operation is based on information on copyright protection recorded on the disc recording medium along with the main information signal to be played back and based on digital-watermark information used as information on copy control added to the main information signal for implementing copy control.

As described above, information on copyright protection is various kinds of information recorded on a recording medium so as to allow a person committing an illegal copying act to be investigated with ease and to be also proven easily, and the use of an illegally copied main information signal to be disabled as well. In the embodiments described below, the information on copyright protection is exemplified by adapting information on the media type having a predetermined relation with the information on copy control.

A disc recording medium can be either an unrewritable read-only ROM disc containing a main information signal recorded legally by a content maker, or a RAM disc recorded with information which can be rewritten by the user. These 2 types of disc can be distinguished from each other by detecting information on the media type recorded in the TOC or the directory of each disc.

The information on copy control added to a main information signal recorded on a ROM disc presented to the user to protect a copyright can be copy-free control information which is an exception allowing unrestricted copy operations, or never-copy control information absolutely prohibiting production of a copy as described earlier.

In the case of a main information signal presented to the user by way of the Internet or through broadcasting media, it is possible to add information on copy control indicating a never-copy control implementation absolutely prohibiting production of a copy, or a one-copy control implementation allowing only the first-generation copy to be produced. In the case of a RAM disc, no-more-copy control information shall be added to a main information signal recorded on the disc to indicate that no more copies of the signal can be produced.

Thus, any pair of information on the media type and information on copy control added to a main information signal other than those described above is judged to indicate that the main information signal has been obtained as a result of an illegal copy operation and its use can be restricted. In addition, the information-signal playback system described below is also capable of preventing a main information signal obtained as a result of an illegal copy operation from being played back and utilized by alteration of the information on the media type.

It should be noted that the disc recording medium used in the embodiment described below is a DVD. In addition, while various kinds of data such as a video signal (or picture data), an audio signal and a program can be recorded as a main information signal on the DVD, it is assumed in the following description that the main information signal recorded on the DVD is a video signal in order to make the description simple. In the following description, a rewritable DVD is referred to as a RAM disc while an unrewritable read-only DVD is referred to as a ROM disc.

[Presentation of an Information Signal to the User]

The following description includes an explanation of presentation of a digital video signal with information on copy control added thereto. Routes through which an information signal is presented to the user include a ROM disc produced by a content maker, a network such as the Internet and broadcasting media such as satellite broadcasting or cable broadcasting.

In either case, since the digital video signal may be illegally copied and used, information on copy control is added to the digital video signal as digital-watermark information which is difficult to alter, and the digital video signal is subjected typically to encryption processing (scramble processing) according to the CSS system.

It should be noted that, in the embodiments, the information on copy control is subjected to a spectrum-spreading process by using a series of PN (Pseudo-random Noise) codes which are referred to hereafter as PN codes, and the information on copy control completing the spectrum-spreading process is superposed on the digital video signal as digital-watermark information.

First of all, presentation of a main information signal by means of a ROM disc is explained by referring to FIG. 6. FIG. 6 is a block diagram showing a recording apparatus used by a content maker to record a main information signal in a process to produce a regular ROM disc wherein a recorded digital video signal and digital-watermark information added thereto as information on copy control are subjected to the encryption processing according to the CSS system before being recorded onto the ROM disc.

As shown in FIG. 6, a digital video signal S51 to be recorded onto a ROM disc 400 is supplied to an adder 53 by way of an input terminal 51. Meanwhile, from an input terminal 52, a vertical synchronization signal VD separated from the digital video signal S51 is supplied as a timing signal to a PN-code generating unit 541 and an information on copy control generating unit 542 which are employed in an SS (spectrum spreading)-information on copy control generating unit 54.

Using a clock signal synchronized with the vertical synchronization signal VD, the PN-code generating unit 541 generates a series of PN codes starting with the first code to be used in a spectrum-spreading process of the information on copy control by each N fields, where N is an integer.

At the same time, using the clock signal synchronized with the vertical synchronization signal VD, the information on copy control generating unit 542 generates an information on copy control series to be superposed on the digital video signal by each N fields in the same way as the PN-code generating unit 541. The series of PN codes generated by the PN-code generating unit 541 and the information on copy control series generated by the information on copy control generating unit 542 are supplied to a multiplier 543.

That is to say, the PN-code generating unit 541 and the information on copy control generating unit 542 generate a series of PN codes and the information on copy control series, respectively starting from the beginnings of the series by using the same clock signals with the same timing synchronized to the vertical synchronization signal VD by typically each field or by each frame, supplying the series of the codes and the information to the multiplier 543.

In the multiplier 543, the information on copy control series is subjected to a spectrum-spreading process by using the series of PN codes to generate SS-information on copy control which is then supplied to a level control unit 544. The level control unit 544 adjusts the level of the SS-information on copy control so that the SS-information on copy control has such a low level as not to disturb a picture represented by the digital video signal when the picture is displayed on a monitor to which the digital video signal is supplied along with the SS-information on copy control superposed thereon.

The SS-information on copy control S52 with an adjusted level is then supplied to the adder 53.

The adder 53 superposes the SS-information on copy control S52 on the digital video signal S51 to generate a digital video signal S53. The digital video signal S53 with the SS-information on copy control S52 superposed thereon is then supplied to a data compressing unit 55. The data compressing unit 55 compresses the digital video signal S53 in accordance with the MPEG system, supplying a compressed digital video signal S54 to an encryption unit 56.

In this embodiment, the encryption unit 56 carries out encryption processing according to the CSS system on the digital video signal S54, if the information on copy control superposed on the digital video signal S54 prohibits copy operation or restricts production of copy generations, to generate an encrypted digital video signal S55 which is then supplied to a write unit 58.

The write unit 58 also receives information on the media type from a media-type generating unit 57. As described above, the information on the media type indicates whether the disc 400 is a ROM or RAM disc. The write unit 58 writes the information on the media type into an area in the disc 400, such as the TOC or the directory, into which the user never records data. In this case, since the disc 400 is a ROM disc, the information on the media type indicating that the disc 400 is a ROM disc is recorded into the disc 400.

In addition, as for the encrypted digital video signal S55, the write unit 58 also records information such as an encryption key used in the processing to encrypt the digital video signal S55 in accordance with the CSS system into an area on the disc 400 from which the user can not read out data. The digital video signal S55 itself is also written by the write unit 58 into the data area of the disc 400.

In this way, it is possible to produce the so-called "commercially available" ROM disc containing a digital video signal with SS-information on copy control superposed thereon as digital-watermark information or containing a digital video signal completing encryption processing according to the CSS system in order to implement copy generation restriction on the digital video signal.

As described earlier, the information on copy control indicates one of the control implementations, namely, copy free, one copy (allowing the first copy generation to be produced), no more copy (allowing no subsequent copy generations to be produced) and never copy (absolutely allowing no copy).

The disc 400 is the ROM disc produced legitimately by a content maker to contain a digital video signal. The never-copy control information is superposed on the digital video signal recorded into the disc 400 to protect the digital video signal against an illegal copy operation.

Subjected to a spectrum-spreading process and superposed on the digital video signal as digital-watermark information, the information on copy control does not degrade the digital video signal, and can not be removed or altered. The information on copy control superposed on the digital video signal as digital-watermark information can be detected by equipment to be described later such as a data processing unit or a recording apparatus with a high degree of reliability, making it possible to execute control of processing carried out on the information signal such as playback control and copy control based on the detected information on copy control.

Figure 7A:
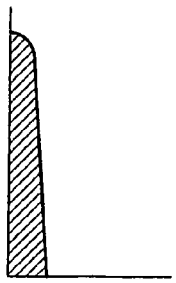
FIGS. 7A to 7D are diagrams used for explaining a relation between an information signal and an SS-information on copy control (digital-watermark information) superposed on the information signal.
Figure 7B:
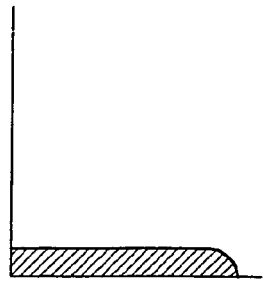

FIGS. 7A to 7D are diagrams showing relations between the SS-information on copy control superposed on the digital video signal and the digital video signal in terms of a spectrum. The information on copy control is a signal that conveys a small amount of information having a low bit rate and occupies a narrow band as shown in FIG. 7A. After completing the spectrum-spreading process, the information on copy control becomes a signal occupying a broad band as shown in FIG. 7B. As shown in FIGS. 7A and 7B, the level of the SS-information on copy control (the spectrum-spreading processed signal) is inversely proportional to the width of the band.

Figure 7C:
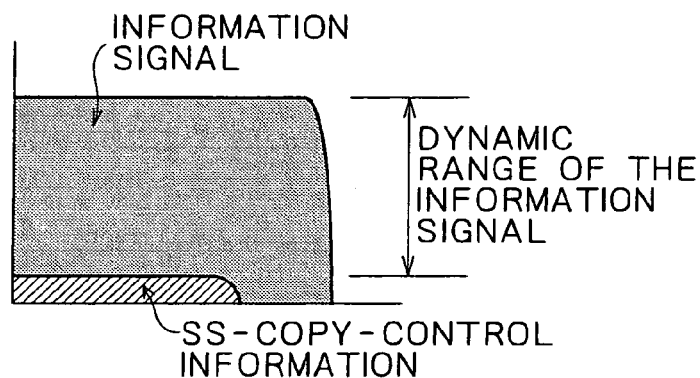

As described above, the SS-information on copy control is added to the digital video signal S51 by the adder 53. The adder 53 superposes the SS-information on copy control on the digital video signal S51 at a level smaller than a dynamic range of the digital video signal S51 as shown in FIG. 7C, so that the digital video signal S51 is hardly degraded by the superposition. Thus, when the digital video signal with SS-information on copy control superposed thereon is played back and supplied to a monitor receiver to display pictures thereon, effects of the SS-information on copy control hardly exist. As a result, fine played-back-pictures can be obtained.

Figure 7D:
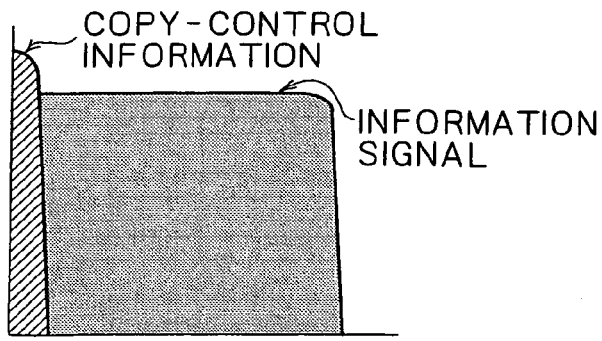
Figure 8:
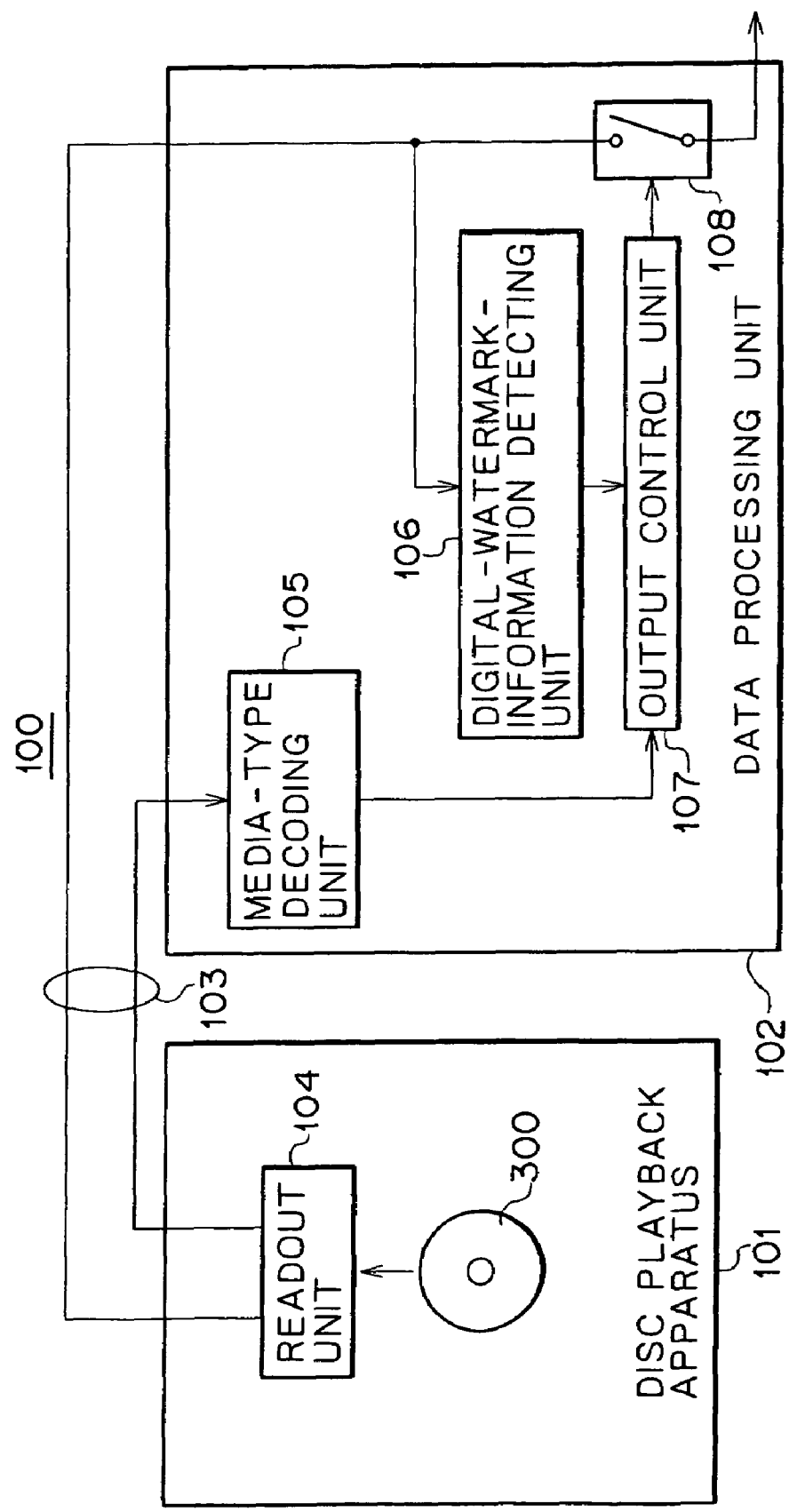
FIG. 8 is a block diagram used for explaining an information-signal playback system in which an operation to play back a main information signal from a disc is controlled by taking information on an attribute of a recording medium into consideration.

As will be described later, if a spectrum-inverse-spreading process needs to be carried out in order to detect the SS-information on copy control, the SS-information on copy control is restored back into a signal with a narrow band as shown in FIG. 7D as a result of the spectrum-inverse-spreading process. By providing a sufficiently large band spreading factor, the power of information on copy control detected as a result of the spectrum-inverse-spreading process is greater than the information signal which is the video signal in the case of the embodiment, thereby being detected.

In this case, since the SS information on copy control added to the video signal is superposed thereon at the same time and at the same frequency as the video signal, the SS information on copy control can be removed and corrected by using a frequency filter and a simple information replacement technique respectively.

Thus, by superposing necessary SS information on copy control on a video signal and recording the signal, the information on copy control can be transferred to a receiver with a high degree of reliability. In addition, if the information on copy control to be superposed on an information signal such as a video signal is subjected to a spectrum-spreading process at a signal power smaller than that of the information signal as is the case with the above-mentioned embodiment, degradation of the information signal can be minimized.

Therefore, since it is thus hard to alter and remove SS information on copy control superposed on an information signal such as a video signal, an operation to illegally copy a video signal can be made difficult.

As already mentioned, information on the media type is recorded on a disc 400 for recording a digital video signal by using the recording apparatus 50 shown in FIG. 6. It should be noted, however, that by manufacturing a disc containing information on the media type from the beginning, it is not necessary to the record information on the media type on the disc for recording a main-information signal such as a digital video signal by using the recording apparatus.

In addition, when a digital video signal to include the never-copy or one-copy control information described above is presented to the user by way of the Internet or by means of broadcasting media, for example, the information on copy control is superposed on the digital video signal as digital-watermark information and the digital video signal including the information on copy control are subsequently compressed in accordance with the MPEG system and then encrypted in accordance with the CSS system in the same way as the recording apparatus 50 shown in FIG. 6 before being presented to the user.

A digital video signal presented to the user by means of a regularly produced ROM disc or through the Internet or broadcasting media as described above may be copied illegally into a RAM disc. An information-signal playback system to be described next is capable of preventing the digital video signal recorded on such a RAM disc from being played back for illegal use by alteration of the information on the media type explained earlier with reference to FIG. 9. That is to say, by disabling an operation to play back a digital video signal illegally copied into a recording medium such as a RAM disc, it is possible to protect the copyright on the digital video signal and, hence, to prevent an information signal from being illegally copied.

First Embodiment

FIG. 1 is a block diagram used for explaining an information-signal playback system (information-signal playback apparatus) 10 implemented by a first embodiment. As shown in the figure, the information-signal playback system 10 comprises a disc playback apparatus 11 and a data processing unit 12 which are connected to each other by a transmission line (bus) 13 for exchanging information signals.

As shown in FIG. 1, the disc playback apparatus 11 comprises a readout unit 111 and a media-type encrypting unit 112. On the other hand, the data processing unit 12 comprises a media-type decoding unit 121, a decryption unit 122, an MPEG decoding unit 123, a digital-watermark-information detecting unit 124, an output control unit 125, and a switch circuit 126.

The readout unit 111 employed in the disc playback apparatus 11 reads out information on the media type Tj and a digital video signal Vi from a disc DK mounted on the disc playback apparatus 11. As described above, this digital video signal Vi is obtained as a result of a series of processes wherein the information on copy control is superposed on an original digital video signal as digital-watermark information and the digital video signal including the information on copy control are subsequently compressed in accordance with the MPEG system and then encrypted in accordance with the CSS system. Both the information on the media type Tj and the digital video signal Vi thus read out are then supplied to the data processing unit 12 through the transmission line 13.

In addition, the information on the media type Tj read out by the readout unit 111 is supplied to the media-type encrypting unit 112 also employed in the disc playback apparatus 11. In this embodiment, the information on the media type Tj is encrypted in accordance with the CSS system, being converted into encrypted information on the media type STj. Then, the encrypted information on the media type STj is also supplied to the data processing unit 12 through the transmission line 13.

In the data processing unit 12, the encrypted information on the media type STj and the digital video signal Vi are supplied to the decryption unit 122 whereas the information on the media type Tj is supplied to the media-type decoding unit 121 as shown in FIG. 1.

The decryption unit 122 decrypts the encrypted digital video signal Vi and the encrypted information on the media type STj by using an algorithm for the encryption carried out on the digital video signal Vi and the information on the media type STj or a correct encryption key to produce a decrypted digital video signal Vm and decrypted information on the media type Mt. A correct decrypted digital video signal Vm and correct decrypted information on the media type Mt are obtained only if a correct algorithm or a correct encryption key is used, that is, only if the decryption is carried out correctly.

If the decryption can not be carried out normally, the switch circuit 126 is turned off by the output control unit 125 so as not to output the video signal.

The digital video signal Vm normally decrypted by the decryption unit 122 is supplied to the MPEG decoding unit 123 and the information on the media type Mt normally decrypted by the decryption unit 122 is supplied to the media-type decoding unit 121.

The MPEG decoding unit 123 decompresses the digital video signal Vm which has been compressed in accordance with the MPEG system to restore the original digital video signal V. The restored original digital video signal V is supplied to the digital-watermark-information detecting unit 124 and an input terminal of the switch circuit 126.

The digital-watermark-information detecting unit 124 detects the information on copy control which is the digital-watermark information superposed on the digital video signal V. As described above, the digital-watermark information superposed on the digital video signal V has completed a spectrum-spreading process. The digital-watermark-information detecting unit 124 detects the information on copy control which is the digital-watermark information superposed on the digital video signal V by carrying out a spectrum-inverse-spreading process.

Figure 2:
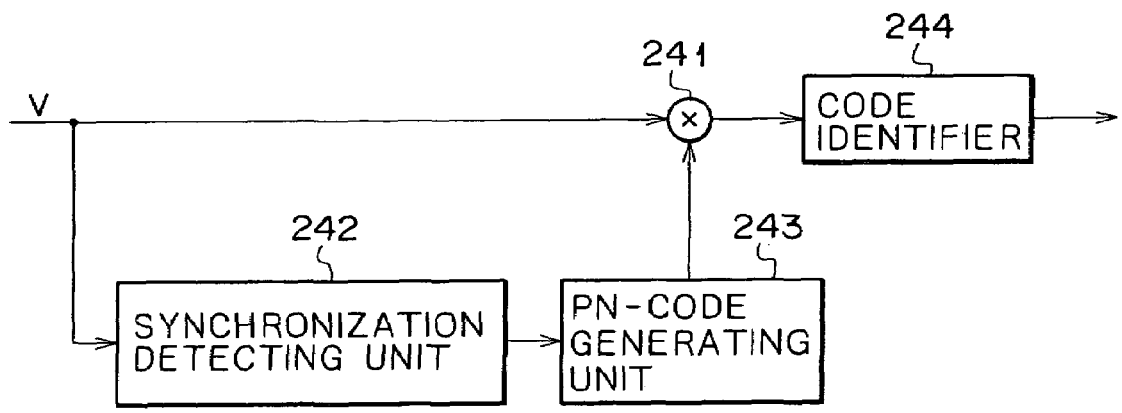
FIG. 2 is a block diagram used for explaining a digital-watermark-information detecting unit employed in the information-signal playback system shown in FIG. 1.

In the first embodiment, the digital watermark-information detecting unit 124 employed in the data processing unit 12 comprises a multiplier 241, a synchronization detector 242, a PN-code generator 243 and a code identifier 244 as shown in FIG. 2. The digital video signal V from the MPEG decoding unit 123 is supplied to the multiplier 241 and the synchronization detector 242 employed in the digital-watermark-information detecting unit 124. The synchronization detector 242 detects a vertical synchronization signal VD from the digital video signal V, supplying the vertical synchronization signal VD to the PN-code generator 243.

The PN-code generator 243 generates a series of PN codes by using a clock signal synchronized to the vertical synchronization signal VD with each PN code generated with timing synchronized to the vertical synchronization signal VD in the same way as the generation of the series of PN codes used in the spectrum-spreading process in the recording circuit 50 shown in FIG. 6. That is to say, the series of PN codes is generated with the same timing as that used in the spectrum-spreading process of the digital-watermark information superposed on the digital video signal and supplied to the multiplier 241.

The multiplier 241 carries out a spectrum-inverse-spreading process by multiplying the digital video signal by the series of PN codes received from the PN-code generator 243 in order to detect a copy-control-information series superposed on the digital video signal V, supplying the copy-control-information series to the code identifier 244.

The code identifier 244 judges the contents of the information on copy control from the copy-control-information series, supplying the result to the output control unit 125. To put in detail, from the copy-control-information series obtained from the spectrum-inverse-spreading process, the code identifier 244 determines whether the information on copy control superposed on the digital video signal V is the copy-free control information allowing copy operations to be carried out freely, the one-copy control information allowing only the first-generation copy to be produced, the no-more-copy control information allowing no further generation copies or the never-copy control information absolutely prohibiting copy operations. The detected type of the information on copy control is supplied to the output control unit 125.

In the mean time, the media-type decoding unit 121 decodes the information on the media type Tj received from the disc playback apparatus 11 and the decrypted information on the media type Mt received from the decryption unit 122 to detect information indicating whether the disc DK mounted on the disc playback apparatus 11 is a ROM or RAM disc, supplying the detected information on the disc type to the output control unit 125. At that time, if the information on the media type Tj is different from the decrypted information on the media type Mt or one of them is missing, the information on the media type is judged to have been altered. In this case, a request to inhibit a playback operation is output to the output control unit 125.

Receiving the request to inhibit a playback operation, the output control unit 125 turns off the switch circuit 126 so that the digital video signal V completing the MPEG decoding process in the MPEG decoding unit 123 is not output. If information on the media type is received from the media-type decoding unit 121 instead of the request to inhibit a playback operation, on the other hand, the output control unit 125 turns the switch circuit 126 on or off based on the information on the media type received from the media-type detecting unit 121 and the information on copy control detected by the digital-watermark-information detecting unit 124.

To be more specific, if the information on the media type received from the media-type decoding unit 121 indicates that the disc DK is a ROM disc and the information on copy control received from the digital-watermark-information detecting unit 124 is the never-copy control information, the switch circuit 126 is turned on to allow the MPEG decoding unit 123 to output the digital video signal V completing the MPEG decoding process.

It should be noted that, in another case which is hardly possible from the copyright-protection point of view as described earlier, the one-copy control information allowing the first-generation copy to be produced is added to a video signal recorded on a ROM disc. Also for such a disc, the switch circuit 126 is turned on to allow the MPEG decoding unit 123 to output the digital video signal V completing the MPEG decoding process.

If the information on the media type received from the media-type decoding unit 121 indicates that the disc DK is a ROM disc and the information on copy control received from the digital-watermark-information detecting unit 124 is the no-more-copy control information, the switch circuit 126 is turned off to prevent the digital video signal V completing the MPEG decoding process from being output.

If the information on the media type received from the media-type decoding unit 121 indicates that the disc DK is a RAM disc and the information on copy control received from the digital-watermark-information detecting unit 124 is the no-more-copy control information, the switch circuit 126 is turned on to allow the MPEG decoding unit 123 to output the digital video signal V completing the MPEG decoding process.

If the information on the media type received from the media-type decoding unit 121 indicates that the disc DK is a RAM disc and the information on copy control received from the digital-watermark-information detecting unit 124 is the never-copy or one-copy control information, the switch circuit 126 is turned off to prevent the digital video signal V completing the MPEG decoding process from being output. It should be noted that such a RAM disc with such information on copy control is not seen in the normal usage as described before.

As described above, the encrypted information on the media type STj is output by the disc playback apparatus 11 to the data processing unit 12 along with the digital video signal Vi and the information on the media type Tj. Since the encrypted information on the media type STj is obtained as a result of an encryption process, it is not easy to alter the information STj. Thus, by merely altering the information on the media type Tj, an operation to play back the digital video signal Vi can not be carried out since a result of comparison of the encrypted information on the media type STj with the information on the media type Tj will immediately indicate whether or not the information on the media type Tj has been altered.

Assume that a digital video signal with the never-copy control information superposed thereon is illegally copied from a ROM disc (which is the legal means of presentation of the digital video signal) to a RAM disc, and the information on the media type is changed from information indicating a RAM disc to one indicating a ROM disc. Even in this case, an operation to play back the illegally copied digital video signal is disabled.

Assume that a digital video signal on which digital-watermark information such as the never-copy or one-copy control information presented to the user through the Internet or broadcasting media and illegally copied to a RAM disc is superposed, and that the information on the media type is changed from information indicating a RAM disc to one indicating a ROM disc in an operation to play back the illegally copied digital video signal. In this case, similarly, such an illegal operation is also disabled as well.

As described above, it is possible to reliably prevent a digital video signal obtained as a result of an illegal copy operation from being utilized. In addition, even when the information on the media type Tj is not altered, it is also possible to prevent a digital video signal obtained as a result of an illegal copy operation from being played back on the basis of the information on the media type and the information on copy control detected from the digital video signal. As added to the digital video signal as digital-watermark information, the information on copy control can not be removed and altered. Thus, it is possible to reliably execute control of an operation to play back the digital video signal in consideration of the information on copy control.

Modification of the First Embodiment

In the first embodiment described earlier, a digital video signal presented to the user by using a ROM disc or through a network such as the Internet is obtained by superposing information on copy control on a base-band digital video signal prior to an MPEG encoding process in digital-watermark processing as described earlier with reference to FIG. 6.

However, information on copy control may be superposed in digital-watermark processing on an elementary stream obtained as a result of an MPEG encoding process of the digital video signal. In this case, the information on copy control superposed on the digital video signal as digital-watermark information can be detected from the digital video signal completing the MPEG encoding process.

For such a case, an information-signal playback system shown in FIG. 3 can be constructed. A watermark-information detecting unit 211 employed in a data processing unit 21 of the information-signal playback system is different from the watermark-information detecting unit 124 shown in FIG. 1. However, the other components are identical with their counterparts shown in FIG. 1. Components in FIG. 3 identical with their counterparts shown in FIG. 1 are denoted by the same reference numerals as the latter and their explanation is not repeated.

The watermark-information detecting unit 211 employed in a data processing unit 21 detects information on copy control superposed on the MPEG encoded digital video signal Vm as digital-watermark information prior to the MPEG decoding process. To be more specific, the watermark-information detecting unit 211 determines whether the information on copy control superposed on the digital video signal Vm prior to the MPEG decoding process is the copy-free control information, the one-copy control information allowing first-generation copies to be produced, the no-more-copy control information or the never-copy control information, and supplies the detected type of the information on copy control to the output control unit 125.

As described above, even in the case of information on copy control superposed in digital-watermark processing on an elementary stream obtained as a result of an MPEG encoding process of the digital video signal, it is possible to reliably execute control of an operation to play back the digital video signal based on the information on the media type Tj and the information on copy control STj. To put it in detail, an operation to play back a digital video signal from the disc DK can be controlled correctly and reliably on the basis of the information on the media type Tj output by the media-type decoding unit 121 and the information on copy control detected by the digital-watermark-information detecting unit 211.

As shown in FIG. 3, the MPEG decoding unit 123 is placed between the decryption unit 122 and the switch circuit 126. It should be noted, however, that the MPEG decoding unit 123 can also be provided after the switch circuit 126. In this case, the MPEG compressed digital video signal is supplied to the MPEG decoding unit 123 only if the switch circuit 126 is turned on by the output control unit 125, that is, only if an operation to play back the digital video signal is allowed.

Thus, in this case, only a digital video signal, the playback operation of which is allowed, is subjected to an MPEG decoding process. A video signal obtained as a result of an illegal copy operation or a video signal accompanied by information on the media type altered during the transmission between the disc playback apparatus and the data processing unit is not subjected to the MPEG decoding process.

Second Embodiment

In the information-signal playback system implemented by the first embodiment described above, the operation to output a video signal from the data processing unit 12 or 21 is controlled on the basis of unencrypted information on the media type, encrypted information on the media type and information on copy control superposed on the video signal as digital-watermark information.

As a result, even if the outcome of a judgment based on the unencrypted information on the media type, the encrypted information on the media type and the information on copy control superposed on the digital video signal as digital-watermark information indicates that the video signal is obtained as a result of an illegal copy operation, the operation to read out the digital video signal from the disc and the operation to transmit the digital video signal along with the pieces of information on the media type and information on copy control from the disc playback apparatus 11 to the data processing unit 12 or 21 are continued.

In the case of the information-signal playback system implemented by the second embodiment, on the other hand, if the digital video signal to be played back and used is judged to have been obtained as a result of an illegal copy operation, or the unencrypted information on the media type or the encrypted information on the media type supplied by the disc playback apparatus to the data processing unit is judged to have been altered, the operation to read out the digital video signal from the disc itself is disabled so that the signal can not be played back.

FIG. 4 is a block diagram showing an information-signal playback system 30 implemented by the second embodiment. Much like the information-signal playback system 10 implemented by the first embodiment shown in FIG. 1, the information-signal playback system 30 implemented by the second embodiment comprises a disc playback apparatus 31 and a data processing unit 32 which are connected to each other by a transmission line (bus) for exchanging information signals.

As shown in FIG. 4, the disc playback apparatus 31 comprises a readout unit 311, a media-type encrypting unit 312, a control-signal decrypting unit 313 and readout control unit 314. On the other hand, the data processing unit 32 comprises a media-type decoding unit 321, a decryption unit 322, an MPEG decoding unit 323, a digital-watermark-information detecting unit 324, a control-signal generating unit 325 and a control-signal encrypting unit 326.

The readout unit 311 and the media-type encrypting unit 312 employed in the disc playback apparatus 31 as well as the media-type decoding unit 321, the decryption unit 322, the MPEG decoding unit 323 and the digital-watermark-information detecting unit 324 employed in the data processing unit 32 are identical with their respective counterparts in the disc playback apparatus 11 and the data processing unit 12 of the first embodiment described earlier.

Much like the first embodiment, information on the media type is recorded on the TOC or the directory of the disc DK mounted on the disc playback apparatus 31. In addition, a digital video signal and information on copy control superposed thereon are recorded in a data area of the disc DK. As described above, the digital video signal and the information on copy control recorded on the disc DK are obtained as a result of a series of processes wherein the information on copy control is superposed on an original digital video signal as digital-watermark information and the digital video signal including the information on copy control are subsequently compressed in accordance with the MPEG system and then encrypted in accordance with the CSS system.

The readout unit 311 employed in the disc playback apparatus 31 reads out the information on the media type Tj and the digital video signal Vi from the disc DK mounted on the disc playback apparatus 31. The information on the media type Tj and the digital video signal Vi are then supplied to the data processing unit 32 through the transmission line 33.

In addition, the information on the media type Tj read out by the readout unit 311 is supplied to the media-type encrypting unit 312 also employed in the disc playback apparatus 31. Also this second embodiment, the information on the media type Tj is encrypted in accordance with the CSS system, being converted into encrypted information on the media type STj. Then, the encrypted information on the media type STj is also supplied to the data processing unit 32 through the transmission line 33.

In the data processing unit 32, the encrypted information on the media type STj and the digital video signal Vi are supplied to the decryption unit 322 whereas the information on the media type Tj is supplied to the media-type decoding unit 321 as is the case with the information-signal playback system implemented by the first embodiment described earlier.

The decryption unit 322 decrypts the encrypted digital video signal Vi and the encrypted information on the media type STj to produce a decrypted digital video signal Vm and decrypted information on the media type Mt.

The digital video signal Vm is supplied to the MPEG decoding unit 323 and the information on the media type Mt is supplied to the media-type decoding unit 321.

The MPEG decoding unit 323 decompresses the digital video signal Vm which has been compressed in accordance with the MPEG system to restore the original digital video signal V. The restored original digital video signal V is supplied to the digital-watermark-information detecting unit 324.

Much like the digital-watermark-information detecting unit 124 employed in the first embodiment described above, the digital-watermark-information detecting unit 324 determines the type of the information on copy control superposed as digital-watermark information on the digital video signal received from the MPEG decoding unit 323. To put in detail, the digital-watermark-information detecting unit 324 determines whether the information on copy control is the copy-free control information allowing copy operations to be carried out freely, the one-copy control information allowing the first-generation copy to be produced, the no-more-copy control information allowing no further generation copies or the never-copy control information absolutely prohibiting copy operations.

In the mean time, the media-type decoding unit 321 decodes the information on the media type Tj received from the disc playback apparatus 31 and the decrypted information on the media type Mt received from the decryption unit 322 to detect information indicating whether the disc DK mounted on the disc playback apparatus 31 is a ROM or RAM disc, supplying the detected information on the disc type to the control-signal generating unit 325.

At that time, if the information on the media type Tj is different from the decrypted information on the media type Mt or one of them is missing, the information on the media type is judged to have been altered. In this case, a request to inhibit a playback operation is output by the media-type decoding unit 321 to the control signal generating unit 325.

Receiving the request to inhibit a playback operation from the media-type decoding unit 321, the control-signal generating unit 325 generates a control signal to stop the operation to read out the digital video signal from the disc DK in the disc playback apparatus 31, supplying the control signal to the control-signal encrypting unit 326.

If information on the media type is received from the media-type decoding unit 321 instead of the request to inhibit a playback operation, on the other hand, the control-signal generating unit 325 makes a judgment as to whether or not the digital video signal recorded on the disc DK has been obtained as a result of an illegal copy operation. The judgment is based on the information on the media type received from the media-type detecting unit 321 and the information on copy control detected by the digital-watermark-information detecting unit 324. If the digital video signal recorded on the disc DK is judged to have been obtained as a result of an illegal copy operation, a control signal to halt an operation to read out the digital video signal from the disc DK in the disc playback unit 31 is generated and outputted to the control-signal encrypting unit 326.

To be more specific, if the information on the media type received by the control-signal generating unit 325 from the media-type decoding unit 321 indicates that the disc DK is a ROM disc and the information on copy control is the no-more-copy control information, or the information on the media type received from the media-type decoding unit 321 indicates that the disc DK is a RAM disc and the information on copy control is the never-copy or one-copy control information, a control signal to halt the operation to read out the digital video signal from the disc DK is generated and supplied to the control-signal encrypting unit 326.

If the information on the media type indicates that the disc DK is a ROM disc and the information on copy control is the never-copy or one-copy control information, or the information on the media type indicates that the disc DK is a RAM disc and the information on copy control is the no-more-copy control information, a control signal to continue the operation to read out the digital video signal from the disc DK is generated and supplied to the control-signal encrypting unit 326.

The control-signal encrypting unit 326 encrypts the control signal received from the control-signal generating unit 325 in accordance with the CSS system and transmits the encrypted control signal to the control-signal decrypting unit 313 employed in the disc playback apparatus 31.

The control-signal decrypting unit 313 employed in the disc playback apparatus 31 decrypts the encrypted control signal by using the same algorithm as an algorithm for the encryption carried out by the control-signal encrypting unit 326 employed in the data processing unit 32 or a correct encryption key to produce a decrypted control signal which is then supplied to the readout control unit 314. If the control-signal decrypting unit 313 is not capable of normally decrypting the encrypted control signal, the control signal is judged to be abnormal. In this case, a control signal to halt the operation to read out the digital video signal from the disc DK is generated and supplied to the readout control unit 314.

The readout control unit 314 controls the operation to read out the digital video signal from the disc DK in accordance with the control signal received from the control-signal decrypting unit 313. If the encrypted control signal received from the data processing unit is a control signal to halt the operation to read out the digital video signal from the disc DK, the readout control unit 314 controls the readout unit 311 or a disc driving unit not shown in the figure to halt the operation to read out the digital video signal from the disc DK.

As described above, if the control-signal decrypting unit 313 is not capable of normally decrypting the encrypted control signal transmitted from the data processing unit 32 because for example the control signal has been altered during the transmission, a control signal to halt the operation to read out the digital video signal from the disc DK is generated and supplied to the readout control unit 314. Also in this case, the readout control unit 314 controls the readout unit 311 to halt the operation to read out the digital video signal from the disc DK.

As described above, the data processing unit 32 is capable of correctly and reliably making a judgment as to whether or not a digital video signal recorded on the disc DK has been obtained as a result of an illegal copy operation by considering unencrypted information on the media type Tj, encrypted information on the media type STj and information on copy control superposed on the digital video signal as digital-watermark information which are received from the disc playback information 31.

On the basis of the outcome of the judgment, the disc playback apparatus 31 can be controlled to disable the operation itself to read out the digital video signal from the disc DK. Thus, it is possible to reliably prevent the use of a digital video signal which has been obtained as a result of an illegal copy operation.

In addition, in the case of the information-signal playback system 30 implemented by the second embodiment, digital video signal Vi read out from the disc DK, information on the media type Tj and encrypted information on the media type STj are transmitted from the disc playback information 31 to the data processing unit 32 while an encrypted control signal is transmitted from the data processing unit 32 to the disc playback apparatus 31.

Accordingly, in the information-signal playback system implemented by the second embodiment, both the encrypted information on the media type and the encrypted control signal must be decrypted. Thus, an attempt to play back a digital video signal obtained as a result of an illegal copy operation such as alteration of the encrypted information on the media type or the encrypted control signal will cause the operation of reading out the digital video signal from the disc to be disabled. It is therefore possible to reliably prevent the use of the digital video signal obtained as a result of an illegal copy operation. That is to say, the information-signal playback system is capable of improving the reliability of the playback control to prevent the use of the digital video signal obtained as a result of an illegal copy operation.

In addition, in the information-signal playback system implemented by the second embodiment, the operation to play back a digital video signal from the disc DK is halted by the disc playback apparatus 31 which supplies the digital video signal to the data processing unit 32. Thus, it is possible to impose playback restrictions for protection of a copyright with a higher degree of security.

Modification of the Second Embodiment

As described above, information on copy control may be superposed in digital-watermark processing on an elementary stream obtained as a result of an MPEG encoding process of the digital video signal. In this case, by designing an information-signal playback system like one shown in FIG. 5 wherein the information on copy control superposed on the digital video signal as digital-watermark information can be detected from the digital video signal completing the MPEG encoding process, it is possible to impose restrictions on the operation to play back the digital video signal in the disc playback unit 31.

In this case, a watermark-information detecting unit 411 employed in a data processing unit 41 of the information-signal playback system shown in FIG. 5 is different from the watermark-information detecting unit 324 shown in FIG. 4. However, the other components are identical with their respective counterparts shown in FIG. 4. Components in FIG. 5 identical with their counterparts shown in FIG. 4 are denoted by the same reference numerals as the latter and their explanation is omitted.

The watermark-information detecting unit 411 employed in a data processing unit 41 detects information on copy control superposed on the encoded digital video signal prior to the MPEG decoding process and supplies the detected type of the information on copy control to the output control-signal generating unit 325.

As described above, even in the case of information on copy control superposed in digital-watermark processing on an elementary stream obtained as a result of an MPEG encoding process of the digital video signal, it is possible to reliably execute control of an operation to play back the digital video signal based on the information on the media type Tj and the encrypted information on the media type STj in the disc playback apparatus 31.

In the second embodiment, the operation to read out an information signal in the disc playback apparatus is controlled so that, when the operation to read out an information signal in the disc playback apparatus is halted, the operation to output the video signal from the MPEG decoding unit can also be halted as well.

In this case, the MPEG decoding unit can also be controlled directly. As an alternative, a switch circuit like the one employed in the first embodiment is provided for blocking or passing on the video signal output by the MPEG decoding unit to external equipment.

In addition, a control signal for controlling the operation to read out the video signal in the disc playback apparatus is generated and encrypted in the data processing unit before being supplied to the disc playback apparatus as described above. It should be noted that the control signal can be supplied to the disc playback apparatus without being encrypted.

In the descriptions of the first and second embodiments, information on copyright protection is exemplified by information on the media type. It should be noted, however, that the information on copyright protection is not limited to the information on the media type. For example, as information on copyright protection, information on a term of validity to use a main information signal can be added to a recording medium in which the main information signal is recorded. The information on a term of validity is supplied by the disc playback apparatus to the data processing unit which can be executed to prevent the main information signal from being output if the term of validity is found expired.

In this case, both encrypted information on a term of validity and unencrypted information on a term of validity are supplied to the data processing unit as is the case with the above-mentioned embodiments. If the former does not match the latter, the term of validity to use the main information signal is judged to have been altered. In this case, the operation to output the main information signal is halted.

As described above, by controlling the processing to output the main information signal on the basis of the encrypted information on a copyright protection and the unencrypted information on a copyright protection without taking the information on copy control into consideration, it is possible to reliably prevent the main information signal from being used illegally.

Thus, by designing an apparatus for controlling the processing of a main information signal based on encrypted information on copyright protection and unencrypted information on copyright protection, it is possible to reliably prevent the main information signal from being used illegally. Of course, by also taking information such as the information on copy control as is the case with the embodiments described above in consideration, it is possible to even more reliably prevent the main information signal from being used illegally.

In addition to information on a media type and information on a term of validity described above, as information on copyright protection, it is possible to use various kinds of information that may probably be altered in order to illegally use a main information signal. That is to say, as information on copyright protection, CGMS information used as information on copy control or sub-code information of the main information signal such as a digital video signal can also be encrypted by the disc playback apparatus and supplied to the data processing unit.

In this case, by comparing unencrypted sub-code information or unencrypted CGMS information with the encrypted sub-code information or the encrypted CGMS information respectively, it is possible to make a judgment as to whether or not the sub-code information or CGMS information has been altered typically in an attempt to illegally copy the main information signal and, hence, to control the operation to play back the main information signal.

In addition, in the embodiments described above, information on copy control is subjected to a spectrum-spreading process in order to generate digital-watermark information. It should be noted that the technique to create digital-watermark information is not limited to the spectrum-spreading process. That is to say, digital-watermark information can be created from information on copy control and superposed on a main information signal by adopting another digital-watermark technique. The digital-watermark information is detected by using a method depending on the digital-watermark technique.

Information on copy control for controlling copy operations is not limited to digital-watermark information. Other information on copy control such as CGMS information can also be used as well.

In addition, in the embodiments described above, information on the media type and a control signal supplied by the data processing unit to the disc playback apparatus and used for controlling a read operation in the disc playback apparatus are encrypted in accordance with the CSS system. It should be noted that the encryption technique is not limited to that of the CSS system. A variety of encryption techniques can be adopted.

To be more specific, in the case of the second embodiment, in the media-type encrypting unit 312 employed in the disc playback apparatus 31 and the control-information encrypting unit 326 employed in the data processing unit 32 or 41, the encryption technique of the CSS system or an encryption technique using an entirely different algorithm or a different encryption key can be adopted. If the encryption technique adopted in the media-type encrypting unit 312 is different from the encryption technique adopted in the control-information encrypting unit 326, the security offered by the information-signal playback system can be further enhanced.

In addition, in the embodiments described above, the video signal output by the data processing units 12, 21, 32 and 41 is supplied to a monitor receiver or a recording apparatus for recording the information signal. When the video signal output by the data processing units 12, 21, 32 and 41 is supplied to a recording apparatus, for example, it is possible to prevent a main information signal obtained as a result of an illegal copy operation from being further copied illegally since the video signal output by the data processing units 12, 21, 32 and 41 is not a signal obtained as a result of an illegal copy operation. That is to say, the copy control can be executed correctly as well as reliably. Furthermore, also in the case of a data processing unit provided with a facility of a recording apparatus, the copy control can be executed correctly as well as reliably so that a main signal obtained as a result of an illegal copy operation is not copied again.

In addition, in the embodiments described above, a digital video signal recorded on a DVD is played back. It should be noted, however, that the processed signal does not have to be a video signal. For example, it is needles to say that the processed signal can also be an audio signal, a variety of programs or various kinds of data. If the main control signal is a game program, for example, in the first embodiment described above, it is possible to execute control in the data processing unit to prevent the game program from being executed in case the program has been obtained as a result of an illegal copy operation.

The processing of the main information signal controlled in the data processing unit includes various kinds of processing such as recording and execution of the main information signal in addition to the processing to output the main information signal explained in the descriptions of the embodiments.

Furthermore, in the embodiments described above, the disc recording medium is a DVD. It is worth noting, however, the recording medium is not limited to a DVD. For example, the recording medium can be a variety of magnetic optical discs and optical discs such as a CD (compact disc) and an MD (mini disc). That is to say, the present invention can be applied to an apparatus for reading out an information signal from such a disc and processing the signal.

In addition, the disc playback apparatus and the data processing unit described above may be accommodated in a single cabinet like a DVD playback apparatus or a DVD recording apparatus, or each built as a standalone box. To be more specific, the disc playback apparatus and the data processing unit are presented respectively as a disc driver and the main body of a personal computer as described above. Of course, it is possible to present a disc driver (an information-signal reading apparatus) provided with the functions of the disc playback apparatuses 11 and 31 described earlier with reference to FIGS. 1 to 5 as a standalone unit.

By the same token, it is of course possible to present an information-signal processing apparatus provided with the functions of the data processing unites 12, 21, 32 and 41 described earlier with reference to FIGS. 1 to 5 as a standalone unit. The functions to be provided to the information-signal processing apparatus can be presented as software written in a so-called PC card which is used by mounting the card onto typically a personal computer implementing the apparatus. As an alternative, the functions to be provided to the information-signal processing apparatus can also be presented as an add-on board including circuits for implementing the functions. Such a board is plugged onto the information-signal processing apparatus to add the functions thereto.

In addition, in the embodiments described above, the information-signal playback system provided by the present invention comprises a DVD disc drive and a personal computer. It should be noted, however, that the information-signal playback system is not limited to such a configuration. For example, the present invention can also be applied to a system used in conjunction with the Internet or digital satellite broadcasting which serves as transmission media.

In such a system, the disc playback apparatus for presenting a main information signal, information on the media type and encrypted information on the media type is implemented by a server. On the other hand, the data processing unit for receiving and processing these pieces of information is implemented by a client apparatus. In the system built in accordance with the present invention by using the Internet or digital satellite broadcasting as transmission media, it is possible to improve security against an operation to copy an information signal illegally.

As described above, according to an information-signal playback system provided by the present invention, information on copyright protection and read out from a recording medium and the information on copyright protection encrypted to make the information difficult to alter are used. If both do not match each other, the information on copyright protection is judged to have been altered in an attempt to play back an information signal which is obtained as a result of an illegal copy operation. In this case, the operation to play back the information signal is disabled. As a result, it is possible to reliably prevent an information signal obtained as a result of an illegal copy operation from being played back.

What is claimed is:

1. An information-signal playback system comprising an information-signal reading apparatus and an information-signal processing apparatus: the information-signal reading apparatus comprising: readout means for reading out media type information from a recording medium and an encrypted video signal comprising copy control information, the media type information indicating a type for the recording medium; encryption means for encrypting the media type information to create encrypted media type information; and output means for supplying, to the information-signal processing apparatus, the encrypted media type information, the media type information, and the encrypted video signal; and the information-signal processing apparatus comprising: decryption means for decrypting the encrypted media type information and the encrypted video signal received from the information-signal reading apparatus; determining means for determining the copy control information from the decrypted video signal; comparing means for comparing the decrypted media type information with the media type information, and determining whether the media type information has been altered; and control means for controlling output of the video signal based on the media type information, the decrypted media type information, the determination of whether the media type information has been altered, and the copy control information.

2. An information-signal playback system according to claim 1 wherein the encryption means encrypts the media type information in accordance with a CSS system.

3. An information-signal playback system according to claim 1 wherein:
information indicating never-copy or one-copy control implementation for controlling a copy operation has been added to the video signal recorded on the recording medium;
the information-signal processing apparatus includes a detecting means for detecting the information indicating never-copy or one-copy control implementation added to the video signal received from the information-signal reading apparatus; and
the control means controls the predetermined processing carried out on the video signal based at least in part on the information indicating never-copy or one-copy control implementation detected by the detecting means.

4. An information-signal playback system according to claim 3 wherein:
the information indicating never-copy or one-copy control implementation is superposed on the video signal; and
the detecting means detects the superposed information on the video signal.

5. An information-signal reading apparatus comprising:
readout means for reading out media type information from a recording medium and an encrypted video signal comprising copy control information, the media type information indicating a type for the recording medium;
encryption means for encrypting the media type information to create encrypted media type information; and
output means for supplying, to an information-signal processing apparatus, the encrypted media type information, the media type information, and the encrypted video signal;
wherein the information-signal processing apparatus comprises:
decryption means for decrypting the encrypted media type information and the encrypted video signal received from the information-signal reading apparatus;

determining means for determining the copy control information from the decrypted video signal;

comparing means for comparing the decrypted media type information with the media type information, and determining whether the media type information has been altered; and control means for controlling output of the video signal based on the media type information, the decrypted media type information, the determination of whether the media type information has been altered, and the copy control information.

6. An information-signal reading apparatus according to claim 5 wherein the encryption means encrypts the media type information an copyright protection in accordance with a CSS system.

7. An information-signal reading method comprising:

reading out media type information from a recording medium and an encrypted video signal comprising copy control information, the media type information indicating a type for the recording medium;

encrypting the media type information to create encrypted media type information;

supplying, to an information-signal processing apparatus, the encrypted media type information, the media type information, and the encrypted video signal, wherein the information-signal processing apparatus performs the steps of:

decrypting the encrypted media type information and the encrypted video signal;

determining the copy control information from the decrypted video signal;

comparing the decrypted media type information with the media type information to determine whether the media type information has been altered; and controlling output of the video signal based on the media type information, the decrypted media type information, the determination of whether the media type information has been altered, and the copy control information.

8. An information-signal reading method according to claim 7 wherein the media type information is encrypted in accordance with a CSS system.

9. The information-signal playback system according to claim 1, wherein the control means outputs the video signal if the media type information indicates the recording medium is read-only and the copy control information indicates never copy.

10. The information-signal playback system according to claim 1, wherein the control means outputs the video signal if the media type information indicates the recording medium is read-only and the copy control information indicates one copy.

11. The information-signal playback system according to claim 1, wherein the control means does not output the video signal if the media type information indicates the recording medium is read-only and the copy control information indicates no more copies.

12. The information-signal playback system according to claim 1, wherein the control means does not output the video signal if the media type information indicates the recording medium is rewritable and the copy control information indicates never copy.

13. The information-signal playback system according to claim 1, wherein the control means does not output the video signal if the media type information indicates the recording medium is rewritable and the copy control information indicates one copy.

14. The information-signal playback system according to claim 1, wherein the control means outputs the video signal if the media type information indicates the recording medium is rewritable and the copy control information indicates no more copies.

* * * * *